United States Patent
Hall (10) Patent No.: US 6,934,034 B2
(45) Date of Patent: Aug. 23, 2005

(54) SENSOR ARRAY INDUCED PHASE ANGLE CALCULATION BASED ON MIXED SIGNALS

(75) Inventor: David B. Hall, La Crescenta, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 203 days.

(21) Appl. No.: 10/634,251

(22) Filed: Aug. 5, 2003

(65) Prior Publication Data

US 2005/0030547 A1 Feb. 10, 2005

(51) Int. Cl.[7] .............................. G01B 9/02
(52) U.S. Cl. .................................. 356/478
(58) Field of Search ........................ 356/450, 477, 356/478; 250/227.19, 227.27; 367/135, 136, 153, 154; 385/12

(56) References Cited

U.S. PATENT DOCUMENTS

| | | | |
|---|---|---|---|
| 5,227,857 A | 7/1993 | Kersey | |
| 5,283,625 A | 2/1994 | Bunn, Jr. | |
| 6,122,057 A | * 9/2000 | Hall | ........................... 356/450 |
| 6,154,308 A | 11/2000 | Hall | |
| 6,600,586 B1 | 7/2003 | Hall | |

* cited by examiner

Primary Examiner—Gregory J. Toatley, Jr.
Assistant Examiner—Michael A. Lyons
(74) Attorney, Agent, or Firm—Patti & Brill, LLC (57) ABSTRACT

A sensor array employs a parameter to induce a time-varying phase angle $\phi$ on an optical signal that comprises a phase generated carrier based on a single frequency. The time-varying phase angle $\phi$ is calculated through employment of a plurality of samples obtained approximately at a time $t_s$, where the plurality of samples are based on a plurality of mixed signals output from a mixer component that employs an input signal based on the optical signal of the sensory array.

22 Claims, 7 Drawing Sheets

SENSOR ARRAY INDUCED PHASE ANGLE CALCULATION BASED ON MIXED SIGNALS

TECHNICAL FIELD

The invention relates generally to signal processing and more particularly to demodulation of signals from fiber optic sensor arrays.

BACKGROUND

Fiber optic sensor arrays of a time division multiplexed ("TDM") system are often used to measure a change in an external parameter, for example, acoustic vibration, fluid pressure variations, acceleration, and magnetic field intensity. The fiber optic sensor array employs a phase generated carrier with a period T to measure the change in the external parameter at a given sampling rate. The fiber optic sensor array converts a time-varying phase angle associated with the external parameter to an amplitude variation on an output pulse of light.

The phase angle is measured through various demodulation techniques of the output pulse. Typical demodulation techniques employ a quadrature component Q and an in-phase component I of the output pulse. The quadrature component Q corresponds to a sine of the phase angle, and the in-phase component I corresponds to a cosine of the phase angle. An arctangent of the ratio Q/I is equal to the phase angle. The magnitude of the change in the external parameter can then be calculated from the change in the phase angle.

Calculation of the quadrature component Q and the in-phase component I requires multiple samples of the output pulse at specific intervals of the phase generated carrier. The phase generated carrier comprises a period that is significantly longer than a period of the output pulse. The longer period of the phase generated carrier requires the samples to span several output pulses to obtain each required interval of the phase generated carrier. It is desirable to increase the rate of calculation of the phase angle to promote an increase in throughput. For a constant sampling rate, the number of required samples must be reduced to increase the rate of calculation of the phase angle.

Thus, a need exists for reduced numbers of required samples for demodulation techniques of fiber optic sensor arrays that employ phase generated carriers.

SUMMARY

The invention in one embodiment encompasses a method. A sensor array employs a parameter to induce a time-varying phase angle $\phi$ on an optical signal that comprises a phase generated carrier based on a single frequency. The time-varying phase angle $\phi$ is calculated through employment of a plurality of samples obtained approximately at a time $t_s$, where the plurality of samples are based on a plurality of mixed signals output from a mixer component that employs an input signal based on the optical signal of the sensory array.

Another embodiment of the invention encompasses an apparatus. A sensor array employs a parameter to induce a time-varying phase angle $\phi$ on an optical signal that comprises a phase generated carrier based on a single frequency. The apparatus comprises a processor component that calculates the time-varying phase angle $\phi$ through employment of a plurality of samples obtained approximately at a time $t_s$, where the plurality of samples are based on a plurality of mixed signals output from a mixer component that employs an input signal based on the optical signal of the sensory array.

A further embodiment of the invention encompasses an article. The article comprises one or more computer-readable signal-bearing media. A sensor array employs a parameter to induce a time-varying phase angle $\phi$ on an optical signal that comprises a phase generated carrier based on a single frequency. The article includes means in the one or more media for calculating the time-varying phase angle $\phi$ through employment of a plurality of samples obtained approximately at a time $t_s$, where the plurality of samples are based on a plurality of mixed signals output from a mixer component that employs an input signal based on the optical signal of the sensory array.

DESCRIPTION OF THE DRAWINGS

Features of exemplary implementations of the invention will become apparent from the description, the claims, and the accompanying drawings in which:

DETAILED DESCRIPTION

Figure 1:
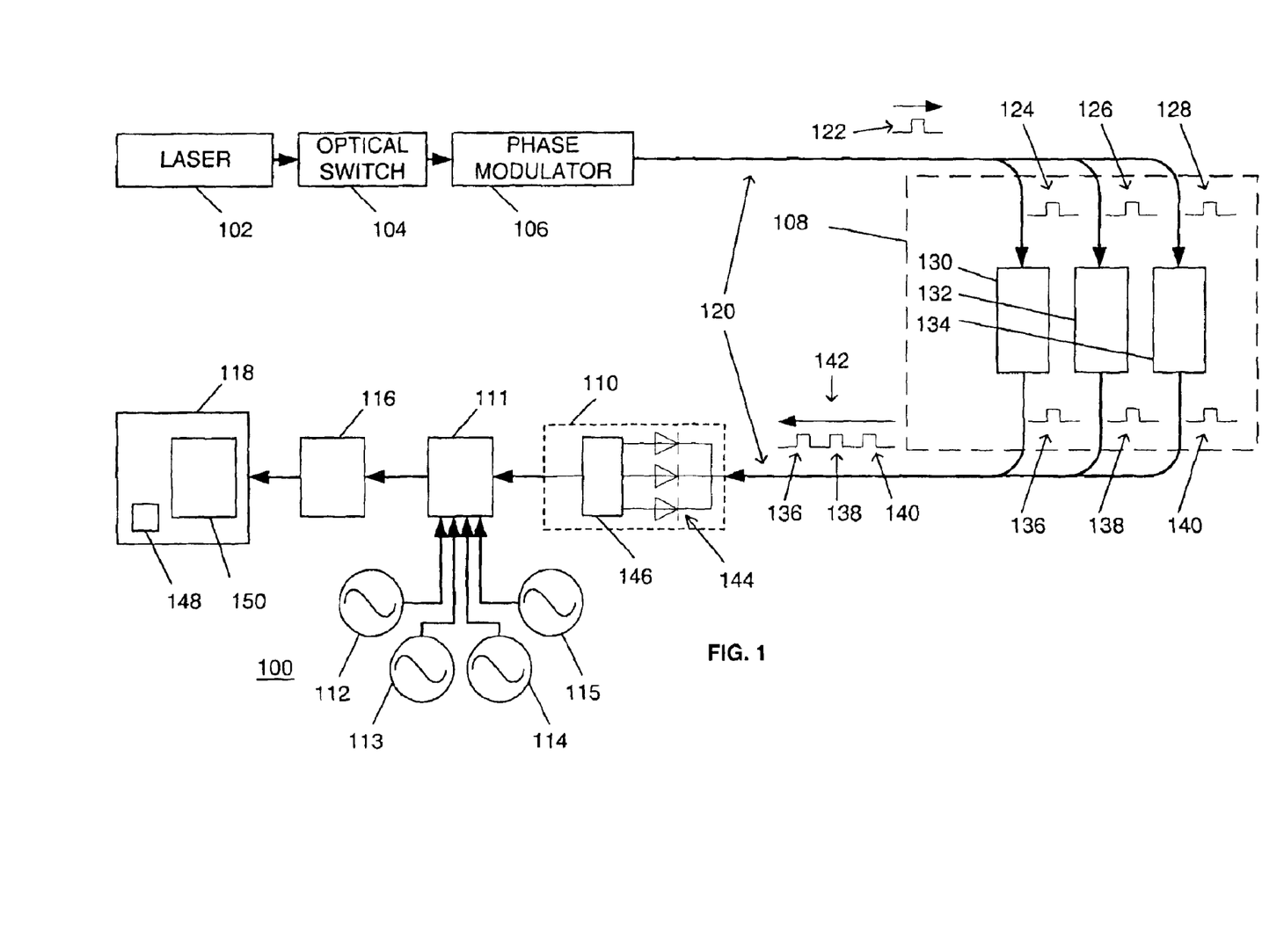
FIG. 1 is a representation of one exemplary implementation of an apparatus that comprises one or more lasers, one or more optical switches, one or more phase modulators, one or more sensor arrays, one or more photodetectors, one or more mixer components, one or more oscillator components, one or more filter components, and one or more processor components for performing a calculation of a phase angle.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

Referring to FIG. 1, the apparatus 100 in one example comprises one or more lasers 102, one or more optical switches 104, one or more phase modulators 106, one or more sensor arrays 108, one or more optical receivers 110, one or more mixer components 111, one or more oscillator components 112, 113, 114, and 115, one or more filter components 116, and one or more processor components 118. In one example, the apparatus 100 demodulates an optical signal to measure a change in a parameter, as described herein. The laser 102 in one example comprises a continuous wave laser. The laser 102 generates and sends an optical signal through the optical switch 104 and the phase modulator 106 to the sensor array 108.

The optical switch 104 in one example comprises a time division multiplexed ("TDM") switch. The optical switch 104 gates the optical signal such that the optical signal comprises a stream of optical pulses. The phase modulator 106 impresses a phase generated carrier ("PGC") 120 on the stream of optical pulses. For example, the laser 102, the optical switch 104, and the phase modulator 106 cooperate to create one or more optical pulses 122 that comprise the phase generated carrier 120, as will be understood by those skilled in the art. The optical pulse 122 comprises a period $T_{pulse}$. The period $T_{pulse}$ in one example is approximately between 50 nanoseconds and 1000 nanoseconds. The phase generated carrier 120 in one example is based on a single frequency $f_{pgc}$ and comprises a modulation depth of M. A period $T_{pgc}$ comprises a relationship with the frequency $f_{pgc}=1/T_{pgc}$, as will be understood by those skilled in the art. The frequency $f_{pgc}$ in one example is approximately between 20 MHz and 200 MHz. The phase generated carrier 120 is associated with a demodulation phase offset $\beta$. The phase generated carrier 120 creates a time-varying phase angle equal to $$M \cdot \sin\left(\frac{2\pi \cdot t}{T_{pgc}} + \beta\right).$$

The sensor array 108 in one example comprises one or more sensors 130, 132, and 134, for example, mismatched path interferometers. The sensor array 108 splits the optical pulse 122 into one or more optical pulses 124, 126, and 128, for example, one pulse per sensor. The optical pulses 122, 124, 126, and 128 in one example are substantially the same. The sensors 130, 132, and 134 of the sensor array 108 receive the optical pulses 124, 126, and 128, respectively. The sensors 130, 132, and 134 of the sensor array 108 in one example employ one or more parameters and the optical pulses 124, 126, and 128 to create one or more respective interference pulses 136, 138, and 140. Exemplary parameters comprise acoustic vibration, fluid pressure variations, acceleration, and magnetic field intensity. For example, the sensor 130 splits the optical pulse 124 into a first portion and a second portion. The sensor 130 employs the parameter to induce a time-varying phase angle $\phi$ on the first portion of the optical pulse 124, relative to the second portion of the optical pulse 124. The sensor 130 recombines the first portion of the optical pulse 124 with the second portion of the optical pulse 124 to create the interference pulse 136. A time-varying amplitude variation of the interference pulse 136 represents the time-varying phase angle $\phi$ between the first portion and the second portion of the optical pulse 124.

The optical pulses 122 comprise an intermediary spacing such that the interference pulses 136, 138, and 140 comprise a relatively small spacing, for example, a high duty cycle, as described herein. The interference pulses 136, 138, and 140 comprise a period substantially equal to the period $T_{pulse}$ of the optical pulse 122. The sensor array 108 sends the interference pulses 136, 138, and 140 to the optical receiver 110 in a pulse train 142, for example, in a serial fashion. For example, the optical pulse train 142 comprises the interference pulses 136, 138, and 140.

The optical receiver 110 in one example comprises one or more photodiodes 144. In a further example, the optical receiver 110 comprises a transimpedance amplifier 146. The optical receiver 110 in one example comprises a polarization diversity receiver system as disclosed in U.S. Pat. No. 5,852,507 to Hall, issued May 10, 1996, and assigned to Litton Systems Inc. The optical receiver 110 receives the optical pulse train 142. The optical receiver 110 then creates one or more respective analog electrical signals that represent the interference pulses 136, 138, and 140 from the optical pulse train 142. For example, the optical receiver 110 converts a magnitude of power of the optical pulse train 142 to a voltage signal. The analog electrical signals in one example are defined by $s(t, M, \phi)$, as described herein.

The mixer component 111 in one example comprises a high-frequency analog mixer. The mixer component 111 in one example employs an input signal to create a plurality of mixed signals. The input signal is based on the optical signal, for example, the input signal comprises the analog electrical signals that represent the interference pulses 136, 138, and 140 from the optical pulse train 142. The mixer component 111 mixes the input signal with one or more sinusoidal signals from the oscillator components 112, 113, 114, and 115 to create the plurality of mixed signals. The mixer component 111 then sends the plurality of mixed signals through the filter component 116 to create a plurality of filtered signals, as described herein.

The oscillator components 112, 113, 114, and 115 in one example comprise waveform generators. The oscillator components 112, 113, 114, and 115 generate the one or more sinusoidal signals for the mixer component 111. The sinusoidal signals in one example comprise:

$I_s(t)=\sin[4\pi f_{pgc}(t+t_0)]$, $I_c(t)=\cos[4\pi f_{pgc}(t+t_0)]$, $Q_s(t)=\sin[2\pi f_{pgc}(t+t_0)]$, and $Q_c(t)=\cos[2\pi f_{pgc}(t+t_0)]$.

For example, the oscillator component 112 generates $I_s(t)$, the oscillator component 113 generates $I_c(t)$, the oscillator component 114 generates $Q_s(t)$, and the oscillator component 115 generates $Q_c(t)$. A phasing difference indicated by a time $t_0$ between the sinusoidal signals and the input signal is arbitrary and not controlled, as will be appreciated by those skilled in the art. For example, the calculation of the phase angle $\phi$ is independent of the phase offset of the phase generated carrier with respect to the sinusoidal signals.

The filter component 116 comprises a low-pass filter. The filter component 116 in one example filters the plurality of mixed signals to create a plurality of filtered signals, as described herein. An ideal low-pass filter performs time integration over a time period T. For example, an ideal low-pass filter filters the mixed signals to create the filtered signals:

$F_{is}(M, \phi)=\int s(t, M, \phi) \cdot I_s(t) dt = BTJ_2(M)\cos\phi \sin(4\pi f_{pgc}t_0)$, $F_{ic}(M, \phi)=\int s(t, M, \phi) \cdot I_c(t) dt = BTJ_2(M)\cos\phi \cos(4\pi f_{pgc}t_0)$, $F_{qs}(M, \phi)=\int s(t, M, \phi) \cdot Q_s(t) dt = BTJ_1(M)\sin\phi \cos(2\pi f_{pgc}t_0)$, and $F_{qc}(M, \phi)=\int s(t, M, \phi) \cdot Q_c(t) dt = -BTJ_1(M)\sin\phi \sin(2\pi f_{pgc}t_0)$, where $J_1(M)$ comprises a first order Bessel function and $J_2(M)$ comprises a second order Bessel function. The time integration comprises a time period T such that time-varying components of the mixed signals average out to zero, as will be understood by those skilled in the art. The filter component 116 in one example comprises a Gaussian filter, a fourth order Bessel filter, or a fourth order real pole filter that approximates an ideal low-pass filter, as will be appreciated by those skilled in the art. The time $t_0$ is dependent on a time of travel for the pulse 122 from the optical switch 104 to the optical receiver 110; therefore, the quantity $2\pi f_{pgc}t_0$ changes slowly, as will be understood by those skilled in the art.

The processor component 118 in one example comprises a digital signal processor. In a further example, the processor component 118 comprises an analog-to-digital converter component 148. The processor component 118 in one example comprises an instance of a computer-readable signal-bearing media 150, as described herein. The analog-to-digital converter component 148 converts the filtered signals from the filter component 116 into digital signals.

The processor component 118 in one example serves to sense a change in the parameters by employing the time-varying amplitude variation of the interference pulses 136, 138, and 140 to calculate the time-varying phase angle φ.

An illustrative description of exemplary operation of the apparatus 100 is presented, for explanatory purposes. The laser 102, the optical switch 104, and the phase modulator 106 cooperate to create the one or more optical pulses 122. The sensor array 108 splits the optical pulse 122 into the optical pulses 124, 126, and 128. The sensors 130, 132, and 134 employ the parameters and the optical pulses 124, 126, and 128 to create the interference pulses 136, 138, and 140. The sensor array 108 sends the interference pulses 136, 138, and 140 as the optical pulse train 142 to the optical receiver 110.

The optical receiver 110 creates an analog electrical signal that represent the one or more interference pulses 136, 138, and 140. For example, the analog electrical signal is defined as s(t, M, φ):

$$s(t, M, \varphi) = A + B \cdot \cos(M \cdot \sin(2\pi f_{pgc} \cdot t) - \varphi)$$
$$= A + B \cdot \cos\varphi \cdot \cos(M \cdot \sin(2\pi f_{pgc} \cdot t)) +$$
$$B \cdot \sin\varphi \cdot \sin(M \cdot \sin(2\pi f_{pgc} \cdot t)),$$

where A is an average signal level, B is an interference term signal level, M is the modulation depth, $f_{pgc}$ is the frequency of the phase generated carrier, and φ is the phase angle. The phase angle of s(t, M, φ) comprises a first portion due to the phase generated carrier, $M \cdot \sin(2\pi f_{pgc} \cdot t)$, and a second portion due to the parameter, φ, as will be understood by those skilled in the art.

The mixer component 111 mixes the analog electrical signal with the sinusoidal signals $I_s(t)$, $I_c(t)$, $Q_s(t)$, and $Q_c(t)$ to create the mixed signals $M_{is}(t, M, \phi)$, $M_{ic}(t, M, \phi)$, $M_{qs}(t, M, \phi)$, and $M_{qc}(t, M, \phi)$, respectively. The mixer component then sends the mixed signals $M_{is}(t, M, \phi)$, $M_{ic}(t, M, \phi)$, $M_{qs}(t, M, \phi)$, and $M_{qc}(t, M, \phi)$ through the filter component 116 to create the filtered signals $F_{is}(t, M, \phi)$, $F_{ic}(t, M, \phi)$, $F_{qs}(t, M, \phi)$, and $F_{qc}(t, M, \phi)$, respectively.

The analog-to-digital converter component 148 in one example converts the filtered signal from the filter component 116 into digital signals that represents the interference pulse 136. The processor component 118 in one example samples the filtered signals $F_{is}(t, M, \phi)$, $F_{ic}(t, M, \phi)$, $F_{qs}(t, M, \phi)$, and $F_{qc}(t, M, \phi)$ approximately at a time $t_s$ to obtain the plurality of samples, as described herein. The processor component 118 employs the plurality of samples to calculate an in-phase term $I_{mag}$ and a quadrature term $Q_{mag}$. For example, the processor component 118 calculates:

$$I_{mag}(t_s, \varphi) = \sqrt{F_{ic}(t_s, \varphi)^2 + F_{is}(t_s, \varphi)^2} = |BT \cdot J_2(M) \cdot \cos\varphi|, \text{ and}$$
$$Q_{mag}(t_s, \varphi) = \sqrt{F_{qc}(t_s, \varphi)^2 + F_{qs}(t_s, \varphi)^2} = |BT \cdot J_1(M) \cdot \sin\varphi|.$$

The processor component 118 employs a modulation depth $M_0$ such that $J_1(M_0)$ is substantially equal to $J_2(M_0)$, for example, approximately 2.63 radians, as will be understood by those skilled in the art.

Where $J_1(M_0)$ is substantially equal to $J_2(M_0)$, $I_{mag}(t_s, \phi)$ is proportional to |cos φ| and $Q_{mag}(t_s, \phi)$ is proportional to |sin φ|. The processor component 118 determines a sign of an in-phase term $I(t_s, \phi)$ and a sign of a quadrature term $Q(t_s, \phi)$. For example, $$I(t_s, \phi) = \pm I_{mag}(t_s, \phi), \text{ and}$$
$$Q(t_s, \phi) = \pm Q_{mag}(t_s, \phi).$$

The processor component 118 determines the sign of the in-phase term $I(t_s, \phi)$ to be equal to a sign of the filtered signal $F_{ic}(t_s, M, \phi)$ or $F_{is}(t_s, M, \phi)$ with a largest magnitude.

The processor component 118 determines the sign of the quadrature term $Q(t_s, \phi)$ to be equal to a sign of the filtered signal $F_{qc}(t_s, M, \phi)$ or $F_{qs}(t_s, M, \phi)$ with a largest magnitude. As the value of $t_0$ changes, the magnitude of the filtered signals $F_{ic}(t_s, M, \phi)$, $F_{is}(t_s, M, \phi)$, $F_{qc}(t_s, M, \phi)$, and $F_{qs}(t_s, M, \phi)$ may change. The processor component 118 in one example determines the sign of the in-phase term $I(t_s, \phi)$ and the quadrature term $Q(t_s, \phi)$ at regular intervals to accommodate such a change.

The processor component 118 in one example employs the in-phase term $I(t_s, \phi)$ and the quadrature term $Q(t_s, \phi)$ to calculate the phase angle φ. For example, the processor component 118 calculates the phase angle φ:

$$\phi = \text{arctangent}(Q/I).$$

The processor component 118 in one example employs the change in the phase angle φ between multiple instances of the interference pulses 136, 138, and 140 to determine the change in the parameters employed by the sensors 130, 132, and 134.

Figure 2:
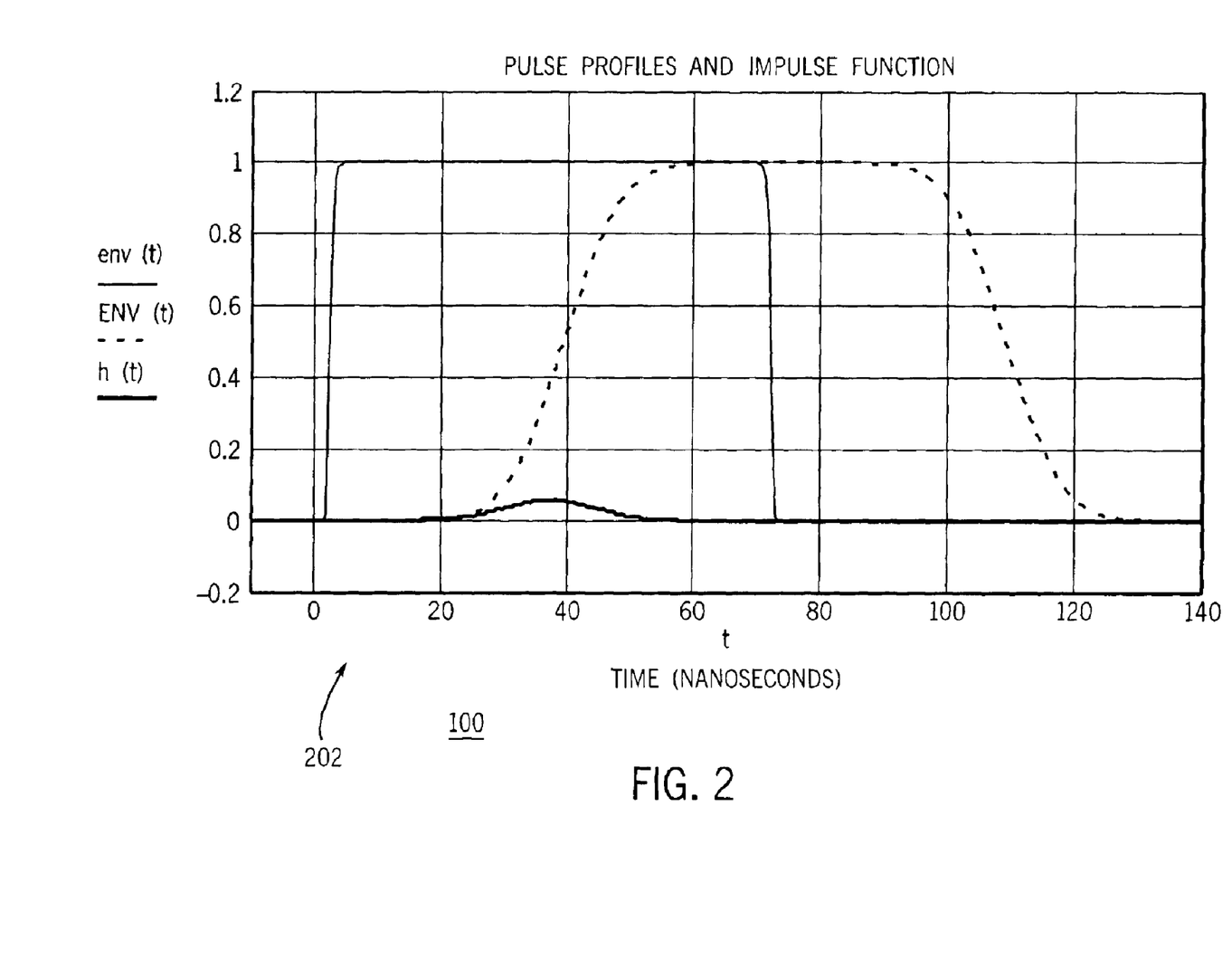
FIG. 2 is a plot of an exemplary interference pulse, an exemplary impulse function, and an exemplary filtered pulse with an exemplary filter component of FIG. 1.

Turning to FIG. 2, a plot 202 comprises a representation of an exemplary interference pulse 136, an impulse function h(t) for an exemplary filter component 116, and an exemplary filtered pulse ENV(t). The interference pulse 136 in one example is defined by:

$$env(t) = \exp\left[-\left(\frac{t-\tau_0}{T}\right)^{108}\right],$$

where T=35 nanoseconds and $\tau_0$=37 nanoseconds. The interference pulse 136 comprises a width of 70 nanoseconds and a rise and fall time approximately equal to one nanosecond. The filter component 116 in one example comprises a Gaussian low pass filter where the impulse function:

$$h(t) = \frac{.5643}{\tau} \cdot \exp\left[-\left(\frac{t-\tau_0}{\tau}\right)^2\right],$$

where τ=10 nanoseconds. A convolution of the impulse function h(t) with the input pulse env(t) comprises the filtered pulse:

$$ENV(t) = \int_0^t h(t-v) \cdot env(v) \cdot dv.$$

The filtered pulse ENV(t) comprises a time delay of 30 nanoseconds, a flat top of width 30 nanoseconds, and a base of width 100 nanoseconds. A frequency response H(f) of the filter component 116 is equal to the Fourier transform of the impulse function. The Fourier transform is taken over a range that is sufficiently large to cover relevant areas of the impulse function. For example, the impulse function is approximately zero outside of a range of 0 nanoseconds to 75 nanoseconds, and the frequency response is equal to:

$$H(f) = \int_0^{75} h(t) \cdot \exp(-2\pi \cdot li \cdot f \cdot t) \cdot dt.$$

Figure 3:
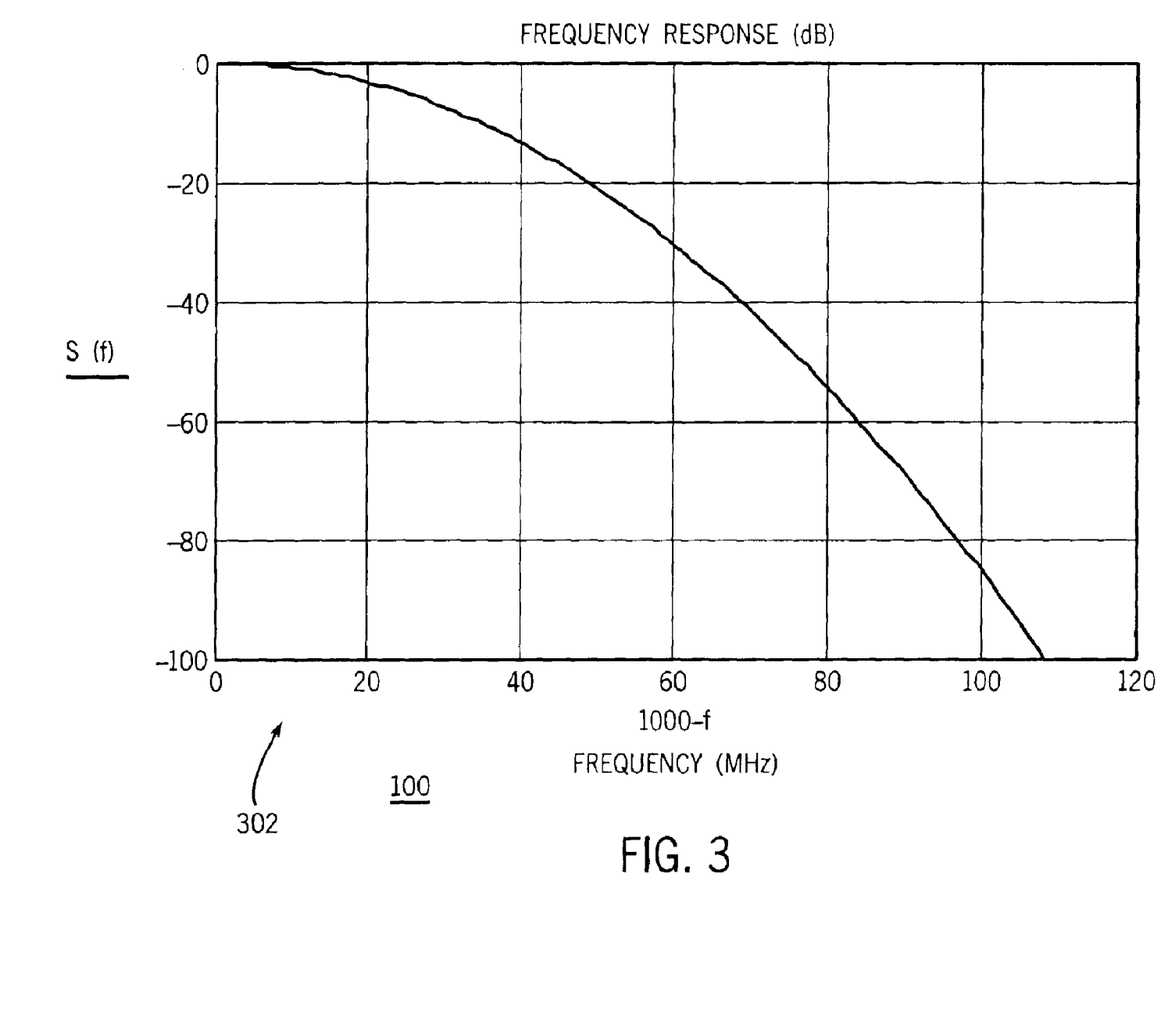
FIG. 3 is a plot of an exemplary roll-off function of the exemplary filter component of FIG. 2.

Turning to FIG. 3, a plot 302 comprises a roll-off function S(f) of the filter component 116 of FIG. 2 where the roll-off is equal to:

$$S(f) = 10 \cdot \log(H(f) \cdot \overline{H(f)}).$$

The plot 302 comprises a roll-off of over 80 dB at 100 MHz.

Figure 4:
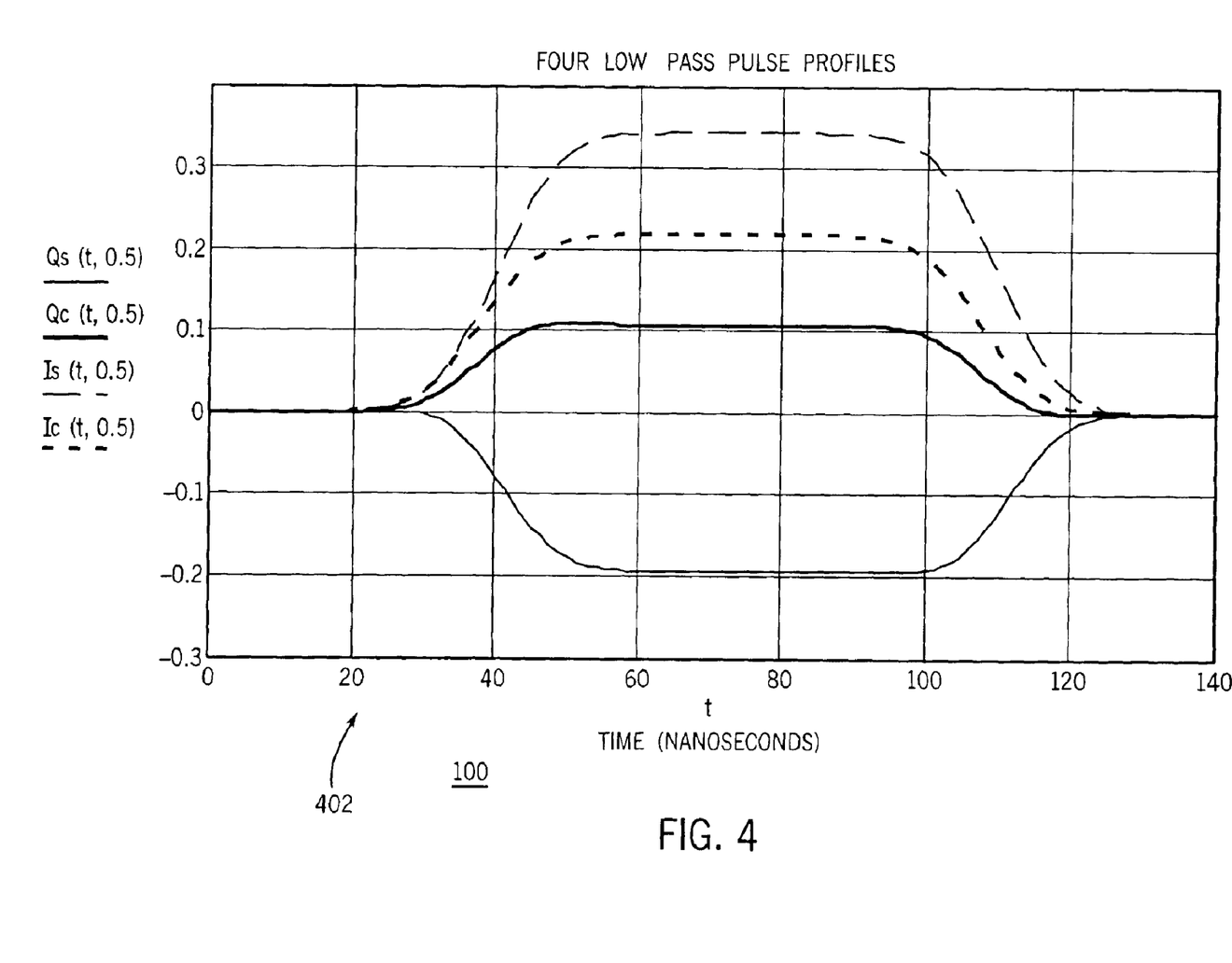
FIG. 4 is a plot of one or more exemplary filtered signals with the exemplary filter component of FIG. 2.

Turning to FIG. 4, a plot 402 comprises the filtered signals $F_{qs}(t, \phi)$, $F_{qc}(t, \phi)$, $F_{is}(t, \phi)$, and $F_{ic}(t, \phi)$ with the filter component 116 of FIG. 2. The plot 402 comprises a phase angle $\phi$ equal to 0.5 radians, a time $t_0$ equal to 4.2 nanoseconds, a modulation depth M equal to 2.63 radians, and a frequency $f_{pgc}$ equal to 100 MHz. The filtered signals are given by a convolution of the impulse function h(t) with a product of the phase generated carrier 120, the sinusoidal signals $I_s(t)$, $I_c(t)$, $Q_s(t)$, and $Q_c(t)$, and the interference pulse 136:

$$F_{qs}(t, \varphi) = \int_0^t h(t-v) \cdot S(v, \varphi) \cdot Q_s(v) \cdot env(v) \cdot dv,$$

$$F_{qc}(t, \varphi) = \int_0^t h(t-v) \cdot S(v, \varphi) \cdot Q_c(v) \cdot env(v) \cdot dv,$$

$$F_{is}(t, \varphi) = \int_0^t h(t-v) \cdot S(v, \varphi) \cdot I_s(v) \cdot env(v) \cdot dv, \text{ and}$$

$$F_{ic}(t, \varphi) = \int_0^t h(t-v) \cdot S(v, \varphi) \cdot I_c(v) \cdot env(v) \cdot dv.$$

The filtered signals $F_{qs}(t, \phi)$, $F_{qc}(t, \phi)$, $F_{is}(t, \phi)$, and $F_{ic}(t, \phi)$ comprise respective filtere pulses with a flat top of an approximate width of 30 nanoseconds and an approximate center at 75 nanoseconds. The processor component 118 in one example samples the filtered signals $F_{qs}(t, \phi)$, $F_{qc}(t, \phi)$, $F_{is}(t, \phi)$, and $F_{ic}(t, \phi)$ at the center of the pulses, for example, $t_s$ is equal to 75 nanoseconds, to promote an increase in accuracy of the samples.

Figure 5:
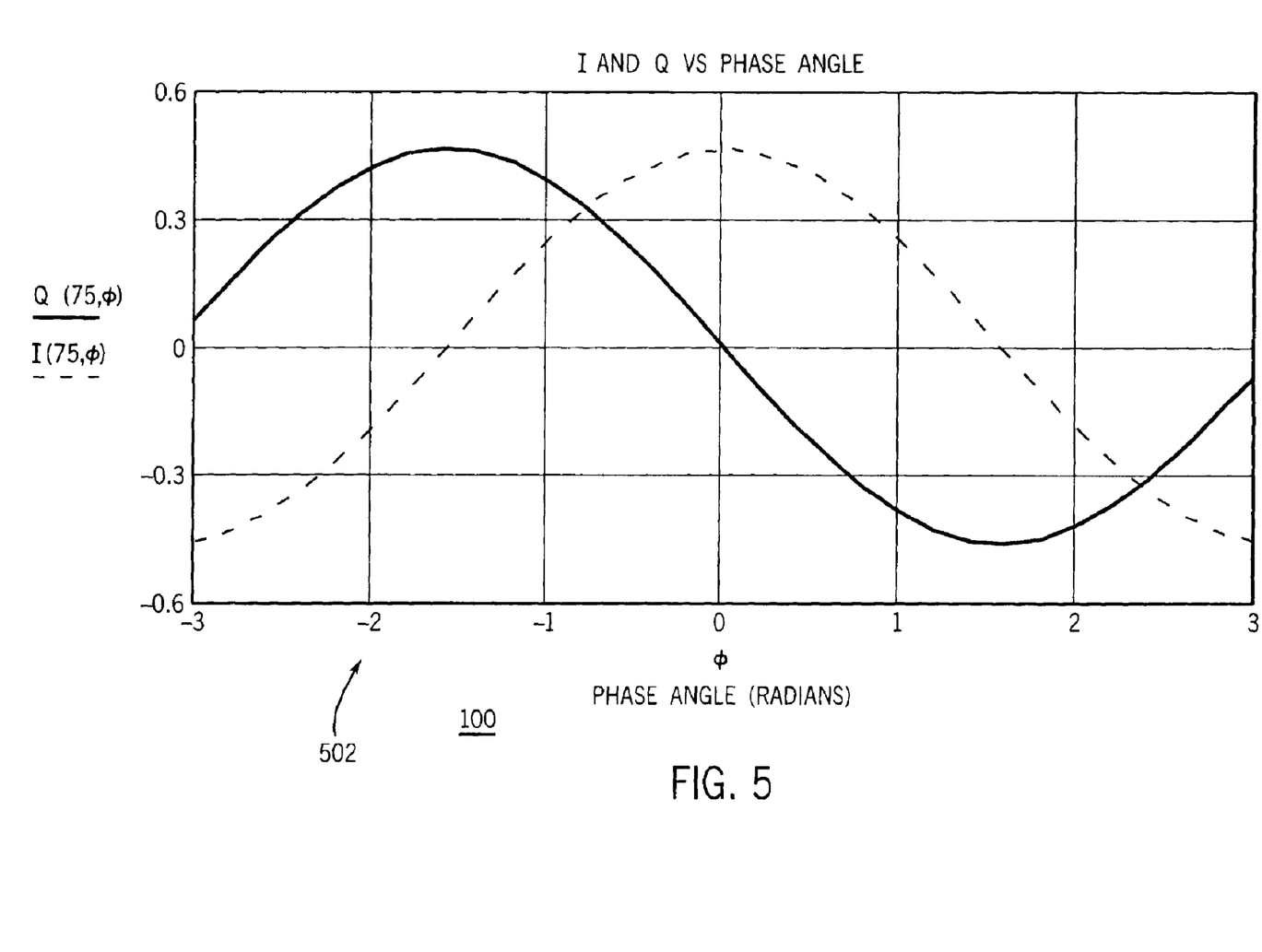
FIG. 5 is a plot of an exemplary in-phase term I(t, $\phi$) and an exemplary quadrature term Q(t, $\phi$) as functions of the phase angle for the filtered signals of FIG. 4.

Turning to FIG. 5, a plot 502 comprises the in-phase term I(t, $\phi$) and the quadrature term Q(t, $\phi$) as functions of the phase angle $\phi$ for the filtered signals of FIG. 4. The time $t_s$ is equal to 75 nanoseconds, the modulation depth M is equal to 2.63 radians, and the time $t_0$ is equal to 4.2 nanoseconds:

$$I_{mag}(t_s, \varphi) = \sqrt{F_{ic}(t_s, \varphi)^2 + F_{is}(t_s, \varphi)^2} \propto |\cos\varphi|, \text{ and}$$

$$Q_{mag}(t_s, \varphi) = \sqrt{F_{qc}(t_s, \varphi)^2 + F_{qs}(t_s, \varphi)^2} \propto |\sin\varphi|.$$

The processor component 118 determines the sign of the in-phase term I($t_s$, $\phi$) to be equal to a sign of the filtered signal $F_{ic}(t_s, M, \phi)$ or $F_{is}(t_s, M, \phi)$ with a largest magnitude. For example, referring to FIG. 4, the processor component 118 employs the sign of the filtered signal $F_{is}(t_s, M, \phi)$. The processor component 118 determines the sign of the quadrature term Q($t_s$, $\phi$) to be equal to a sign of the filtered signal $F_{qc}(t_s, M, \phi)$ or $F_{qs}(t_s, M, \phi)$ with a largest magnitude. For example, referring to FIG. 4, the processor component 118 employs the sign of the filtered signal $F_{qs}(t_s, M, \phi)$.

Figure 6:
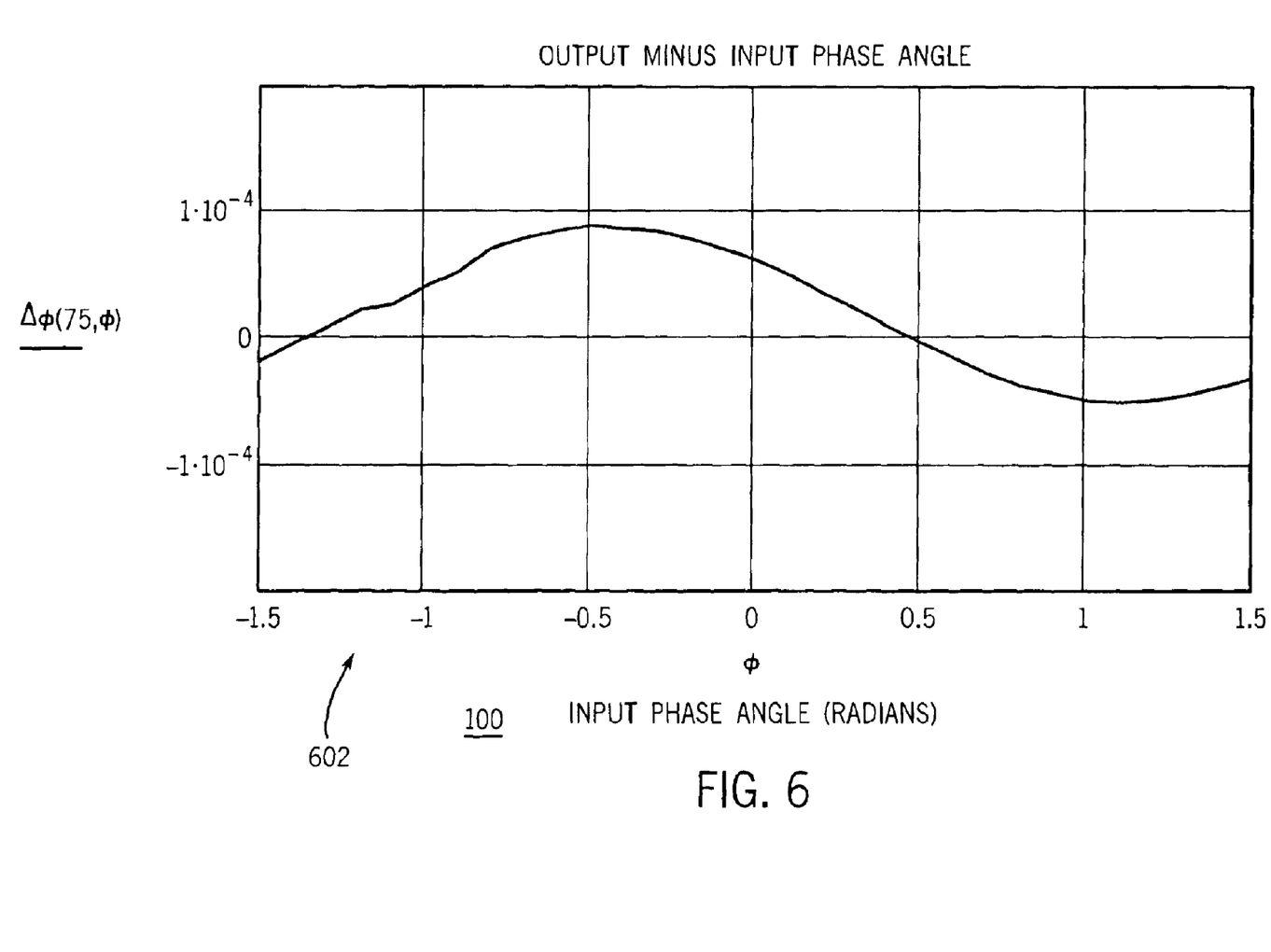
FIG. 6 is a plot of an exemplary error for the calculation of the phase angle of FIG. 5.

Turning to FIG. 6, a plot 602 comprises an error $\Delta\phi(t, \phi)$ for the calculation of the phase angle $\phi$ of FIG. 5. The error $\Delta\phi(t, \phi)$ is equal to an output phase angle minus an input phase angle:

$$\Delta\varphi(t, \varphi) = \arctan\left(\frac{Q(t, \varphi)}{I(t, \varphi)}\right) - \varphi,$$

where t is equal to 75 nanoseconds. The error $\Delta\phi(t, \phi)$ is approximately on the order of 0.1 milliradians.

Figure 7:
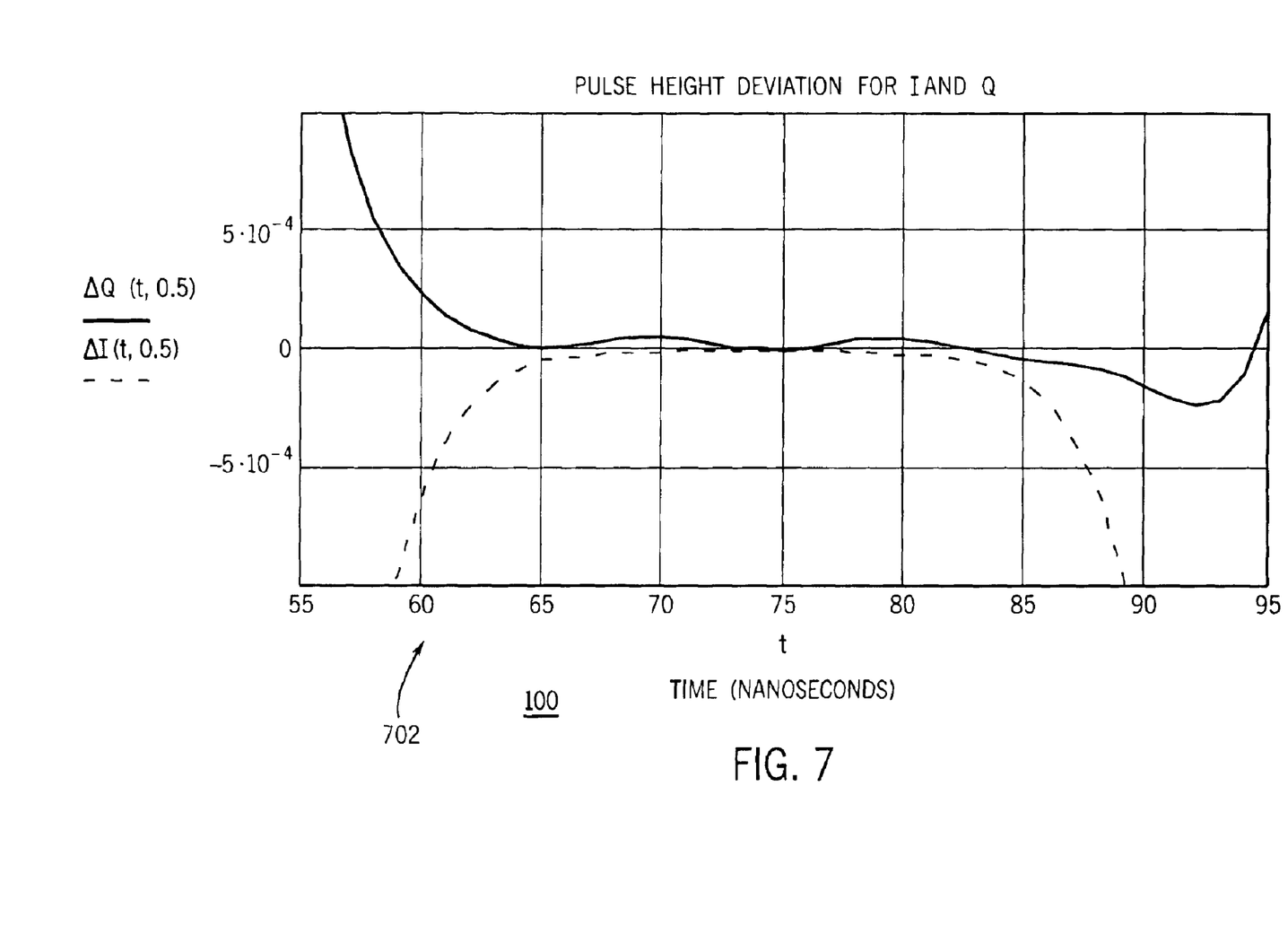
FIG. 7 is a plot of an exemplary pulse height deviation for filtered signals of FIG. 5.

Turning to FIG. 7, a plot 702 comprises a pulse height deviation for the filtered signals of FIG. 5. Accuracy of the calculation of the phase angle $\phi$ is dependent on a relative flatness of the pulses of filtered signals. A pulse height deviation $\Delta I(t, \phi)$ is equal to the magnitude of the in-phase term I(t, $\phi$) minus a magnitude of the in-phase term $\Delta I(t, \phi)$ at the time $t_s$. For example, $\Delta I(t, 0.5)=I(75, 0.5)-I(t, 0.5)$. A pulse height deviation $\Delta Q(t, \phi)$ is equal to the magnitude of the quadrature term Q(t, $\phi$) minus a magnitude of the quadrature term Q(t, $\phi$) at the time $t_s$. For example, $\Delta Q(t, 0.5)=Q(75, 0.5)-Q(t, 0.5)$. The pulse height deviations $\Delta I(t, \phi)$ and $\Delta Q(t, \phi)$ comprise a deviation of less than 0.1% within a flat zone of width 20 nanoseconds centered at $t_s$. The pulse height deviations $\Delta I(t, \phi)$ and $\Delta Q(t, \phi)$ comprise a deviation of less than 1.0% within a flat zone of width 30 nanoseconds centered at $t_s$.

The apparatus 100 in one example employs one or more computer-readable signal-bearing media. An exemplary computer-readable signal-bearing media for the apparatus 100 comprises the recordable data storage media 150 of the processor component 118. For example, the computer-readable signal-bearing media for the apparatus 100 comprises one or more of a magnetic, electrical, optical, biological, and atomic data storage media. In one example, the computer-readable signal-bearing media comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, a sensor array that employs a parameter to induce a time-varying phase angle $\phi$ on an optical signal that comprises a phase generated carrier based on a single frequency, the method comprising the step of:

calculating the time-varying phase angle $\phi$ through employment of a plurality of samples obtained approximately at a time $t_s$, wherein the plurality of samples are based on a plurality of mixed signals output from a mixer component that employs an input signal based on the optical signal of the sensor array.

2. The method of claim 1, wherein the step of calculating the time-varying phase angle $\phi$ through employment of the plurality of samples obtained approximately at the time $t_s$ comprises the steps of:

mixing the input signal with one or more sinusoidal signals to create the plurality of mixed signals;

filtering the plurality of mixed signals to create a plurality of filtered signals;

sampling the plurality of filtered signals at the time $t_s$ to obtain the plurality of samples; and calculating the time-varying phase angle $\phi$ through employment of the plurality of samples.

3. The method of claim 2, wherein the step of mixing the input signal with the one or more sinusoidal signals to create the plurality of mixed signals comprises the steps of:

mixing the input signal with a sinusoidal signal $I_s(t)=\sin[4\pi f(t+t_0)]$ to create a mixed signal $M_{is}(t, \phi)$;

mixing the input signal with a sinusoidal signal $I_c(t)=\cos[4\pi f(t+t_0)]$ to create a mixed signal $M_{ic}(t, \phi)$;

mixing the input signal with a sinusoidal signal $Q_s(t)=\sin[2\pi f(t+t_0)]$ to create a mixed signal $M_{qs}(t, \phi)$; and mixing the input signal with a sinusoidal signal $Q_c(t)=\cos[2\pi f(t+t_0)]$ to create a mixed signal $M_{qc}(t, \phi)$.

4. The method of claim 2, wherein the phase generated carrier comprises a modulation depth M, wherein the input signal comprises an interference term signal level B, wherein a function $J_1(M)$ comprises a first order Bessel function, wherein a function $J_2(M)$ comprises a second order Bessel function, wherein the step of filtering the plurality of mixed signals to create the plurality of filtered signals comprises the steps of:

filtering the mixed signal $M_{is}(t, \phi)$ to create a filtered signal:

$$F_{is}(t, \varphi) = \int_0^t h(t-v) \cdot S(v, \varphi) \cdot I_s(v) \cdot env(v) \cdot dv;$$

filtering the mixed signal $M_{ic}(t, \phi)$ to create a filtered signal:

$$F_{ic}(t, \varphi) = \int_0^t h(t-v) \cdot S(v, \varphi) \cdot I_c(v) \cdot env(v) \cdot dv;$$

filtering the mixed signal $M_{qs}(t, \phi)$ to create a filtered signal:

$$F_{qs}(t, \varphi) = \int_0^t h(t-v) \cdot S(v, \varphi) \cdot Q_s(v) \cdot env(v) \cdot dv;\ \text{and}$$

filtering the mixed signal $M_{qc}(t, \phi)$ to create a filtered signal:

$$F_{qc}(t, \varphi) = \int_0^t h(t-v) \cdot S(v, \varphi) \cdot Q_c(v) \cdot env(v) \cdot dv.$$

5. The method of claim 4, further comprising the steps of: calculating an in-phase term:

$$I_{mag}(t_s, \varphi) = \sqrt{F_{ic}(t_s, \varphi)^2 + F_{is}(t_s, \varphi)^2} \propto |\cos \varphi|;$$

calculating a quadrature term:

$$Q_{mag}(t_s, \varphi) = \sqrt{F_{qc}(t_s, \varphi)^2 + F_{qs}(t_s, \varphi)^2} \propto |\sin \varphi|;\ \text{and}$$

calculating the time-varying phase angle $\phi$ through employment of the in-phase term $I_{mag}(t_s, \phi)$ and the quadrature term $Q_{mag}(t_s, \phi)$.

6. The method of claim 5, further comprising the steps of: determining a sign of an in-phase term $I(t, \phi)$, wherein the in-phase term $I(t, \phi)$ comprises a magnitude equal to the in-phase term $I_{mag}(t, \phi)$; and determining a sign of a quadrature term $Q(t, \phi)$, wherein the quadrature term $Q(t, \phi)$ comprises a magnitude equal to the quadrature term $Q_{mag}(t, \phi)$.

7. The method of claim 6, wherein the step of determining the sign of the in-phase term $I(t, \phi)$ comprises the step of:

determining the sign of the in-phase term $I(t, \phi)$ to be equal to a sign of the filtered signal $F_{ic}(t, \phi)$ or $F_{is}(t, \phi)$ with a largest magnitude;

wherein the step of determining the sign of the quadrature term $Q(t, \phi)$ comprises the step of:

determining the sign of the quadrature term $Q(t, \phi)$ to be equal to a sign of the filtered signal $F_{qc}(t, \phi)$ or $F_{qs}(t, \phi)$ with a largest magnitude.

8. An apparatus, a sensor array that employs a parameter to induce a time-varying phase angle $\phi$ on an optical signal that comprises a phase generated carrier based on a single frequency, the apparatus comprising:

a processor component that calculates the time-varying phase angle $\phi$ through employment of a plurality of samples obtained approximately at a time $t_s$, wherein the plurality of samples are based on a plurality of mixed signals output from a mixer component that employs an input signal based on the optical signal of the sensor array.

9. The apparatus of claim 8 in combination with the mixer component, wherein the mixer component mixes the input signal with one or more sinusoidal signals from an oscillator component to create the plurality of mixed signals;

wherein the mixer component sends the plurality of mixed signals through a filter component to create a plurality of filtered signals;

wherein the processor component calculates the time-varying phase angle $\phi$ through employment of the plurality of samples based on the plurality of filtered signals.

10. The apparatus of claim 9, wherein the one or more sinusoidal signals comprise signals:

$I_s(t)=\sin [4\pi f(t+t_0)]$, $I_c(t)=\cos [4\pi f(t+t_0)]$; and $Q_s(t)=\sin [2\pi f(t+t_0)]$, $Q_c(t)=\cos [2\pi f(t+t_0)]$;

wherein the mixer component mixes the sinusoidal signals $I_s(t)$, $I_c(t)$, $Q_s(t)$, and $Q_c(t)$ with the input signal to create the plurality of mixed signals:

$M_{is}(t, \phi)$, $M_{ic}(t, \phi)$, $M_{qs}(t, \phi)$, and $M_{qc}(t, \phi)$.

11. The apparatus of claim 10, wherein the phase generated carrier comprises a modulation depth M, wherein the input signal comprises an interference term signal level B, wherein a function $J_1(M)$ comprises a first order Bessel function, wherein a function $J_2(M)$ comprises a second order Bessel function;

wherein the mixer component sends the plurality of mixed signals $M_{is}(t, \phi)$, $M_{ic}(t, \phi)$, $M_{qs}(t, \phi)$, and $M_{qc}(t, \phi)$ through the filter component to create the plurality of filtered signals:

$$F_{qs}(t, \varphi) = \int_0^t h(t-v) \cdot S(v, \varphi) \cdot Q_s(v) \cdot env(v) \cdot dv,$$

$$F_{qc}(t, \varphi) = \int_0^t h(t-v) \cdot S(v, \varphi) \cdot Q_c(v) \cdot env(v) \cdot dv,$$

$$F_{is}(t, \varphi) = \int_0^t h(t-v) \cdot S(v, \varphi) \cdot I_s(v) \cdot env(v) \cdot dv,\ \text{and}$$

$$F_{ic}(t, \varphi) = \int_0^t h(t-v) \cdot S(v, \varphi) \cdot I_c(v) \cdot env(v) \cdot dv.$$

12. The apparatus of claim 11 in combination with the filter component, wherein the filter component comprises a Gaussian low-pass filter, a fourth order Bessel filter, or a fourth order real pole filter.

13. The apparatus of claim 11, wherein the processor component employs the filtered signals $F_{is}$ and $F_{ic}$ to calculate an in-phase term:

$$I_{mag}(t_s, \varphi) = \sqrt{F_{ic}(t_s, \varphi)^2 + F_{is}(t_s, \varphi)^2} \propto |\cos\varphi|;$$

wherein the processor component calculates a quadrature term:

$$Q_{mag}(t_s, \varphi) = \sqrt{F_{qc}(t_s, \varphi)^2 + F_{qs}(t_s, \varphi)^2} \propto |\sin\varphi|;$$

wherein the processor component employs the in-phase term $I_{mag}(t, \phi)$ and the quadrature term $Q_{mag}(t, \phi)$ to calculate the time-varying phase angle $\phi$.

14. The apparatus of claim 13, wherein the processor component employs the filtered signals $F_{ic}(t, \phi)$ and $F_{is}(t, \phi)$ to determine a sign of an in-phase term $I(t, \phi)$, wherein the in-phase term $I(t, \phi)$ comprises a magnitude equal to the in-phase term $I_{mag}(t, \phi)$;

wherein the processor component employs the filtered signals $F_{qs}(t, \phi)$ and $F_{qc}(t, \phi)$ to determine a sign of a quadrature term $Q(t, \phi)$, wherein the quadrature term $Q(t, \phi)$ comprises a magnitude equal to the quadrature term $Q_{mag}(t, \phi)$.

15. The apparatus of claim 14, wherein the processor component determines the sign of the in-phase term $I(t, \phi)$ to be equal to a sign of the filtered signal $F_{ic}(t, \phi)$ or $F_{is}(t, \phi)$ with a largest magnitude;

wherein the processor component determines the sign of the quadrature term $Q(t, \phi)$ to be equal to a sign of the filtered signal $F_{qc}(t, \phi)$ or $F_{qs}(t, \phi)$ with a largest magnitude.

16. The apparatus of claim 15, wherein the in-phase term $I(t, \phi)$ and the quadrature term $Q(t, \phi)$ comprise respective pulses centered near $t_s$;

wherein the processor component calculates the time-varying phase angle $\phi$:

$$\varphi = \arctan\left(\frac{Q(t_s, \varphi)}{I(t_s, \varphi)}\right).$$

17. An article, a sensor array that employs a parameter to induce a time-varying phase angle $\phi$ on an optical signal that comprises a phase generated carrier based on a single frequency, the article comprising:
one or more computer-readable signal-bearing media; and
means in the one or more media for calculating the time-varying phase angle $\phi$ through employment of a plurality of samples obtained approximately at a time $t_s$, wherein the plurality of samples are based on a plurality of mixed signals output from a mixer component that employs an input signal based on the optical signal of the sensor array.

18. The article of claim 17, wherein the means in the one or more media for calculating the time-varying phase angle $\phi$ through employment of the plurality of samples obtained at the time $t_s$ comprises:
means in the one or more media for mixing the input signal with one or more sinusoidal signals to create the plurality of mixed signals;
means in the one or more media for filtering the plurality of mixed signals to create a plurality of filtered signals;
means in the one or more media for sampling the plurality of filtered signals to obtain the plurality of samples; and
means in the one or more media for calculating the time-varying phase angle $\phi$ through employment of the plurality of samples.

19. The article of claim 18, wherein the means in the one or more media for mixing the input signal with the one or more sinusoidal signals to create the plurality of mixed signals comprises:
means in the one or more media for mixing the input signal with a sinusoidal signal $I_s(t)=\sin[4\pi f(t+t_0)]$ to create a mixed signal $M_{is}(t, \phi)$;
means in the one or more media for mixing the input signal with a sinusoidal signal $I_c(t)=\cos[4\pi f(t+t_0)]$ to create a mixed signal $M_{ic}(t, \phi)$;
means in the one or more media for mixing the input signal with a sinusoidal signal $Q_s(t)=\sin[2\pi f(t+t_0)]$ to create a mixed signal $M_{qs}(t, \phi)$; and
means in the one or more media for mixing the input signal with a sinusoidal signal $Q_s(t)=\cos[2\pi f(t+t_0)]$ to create a mixed signal $M_{qc}(t, \phi)$.

20. The article of claim 18, wherein the phase generated carrier comprises a modulation depth M, wherein the input signal comprises an interference term signal level B, wherein a function $J_1(M)$ comprises a first order Bessel function, wherein a function $J_2(M)$ comprises a second order Bessel function, wherein the means in the one or more media for filtering the plurality of mixed signals to create the plurality of filtered signals comprises:
means in the one or more media for filtering the mixed signal $M_{is}(t, \phi)$ to create a filtered signal $$F_{is}(t, \varphi) = \int_0^t h(t-v) \cdot S(v, \varphi) \cdot I_s(v) \cdot env(v) \cdot dv;$$

means in the one or more media for filtering the mixed signal $M_{ic}(t, \phi)$ to create a filtered signal $$F_{ic}(t, \varphi) = \int_0^t h(t-v) \cdot S(v, \varphi) \cdot I_c(v) \cdot env(v) \cdot dv;$$

means in the one or more media for filtering the mixed signal $M_{qs}(t, \phi)$ to create a filtered signal $$F_{qs}(t, \varphi) = \int_0^t h(t-v) \cdot S(v, \varphi) \cdot Q_s(v) \cdot env(v) \cdot dv; \text{ and}$$

means in the one or more media for filtering the mixed signal $M_{qc}(t, \phi)$ to create a filtered signal $$F_{qc}(t, \varphi) = \int_0^t h(t-v) \cdot S(v, \varphi) \cdot Q_c(v) \cdot env(v) \cdot dv.$$

21. The article of claim 20, further comprising:
means in the one or more media for calculating an in-phase term:

$$I_{mag}(t_s, \varphi) = \sqrt{F_{ic}(t_s, \varphi)^2 + F_{is}(t_s, \varphi)^2} \propto |\cos\varphi|;$$

means in the one or more media for calculating a quadrature term:

$$Q_{mag}(t_s, \varphi) = \sqrt{F_{qc}(t_s, \varphi)^2 + F_{qs}(t_s, \varphi)^2} \propto |\sin\varphi|; \text{ and}$$

means in the one or more media for calculating the time-varying phase angle $\phi$ through employment of the in-phase term $I_{mag}(t, \phi)$ and the quadrature term $Q_{mag}(t, \phi)$.

22. The article of claim 21, further comprising:

means in the one or more media for determining a sign of an in-phase term $I(t, \phi)$ to be equal to a sign of the filtered signal $F_{ic}(t, \phi)$ or $F_{is}(t, \phi)$ with a largest magnitude; and means in the one or more media for determining a sign of a quadrature term $Q(t, \phi)$ to be equal to a sign of the filtered signal $F_{qc}(t, \phi)$ or $F_{qs}(t, \phi)$ with a largest magnitude.

* * * * *